United States Patent
Findikli et al.

(10) Patent No.: US 6,445,914 B1
(45) Date of Patent: Sep. 3, 2002

(54) METHOD TO PERFORM SUBSIDY PROTECTION FOR TDMA MOBILE STATIONS

(75) Inventors: Nadi Sakir Findikli, Cary; Inderpreet Singh Ahluwalia, Chapel Hill; Hans Carlsson; Annika Birgitta Lindh, both of Cary, all of NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/391,776

(22) Filed: Sep. 8, 1999

(51) Int. Cl.⁷ .................................. H04M 1/66
(52) U.S. Cl. .................. 455/411; 455/558; 455/418
(58) Field of Search ..................... 455/411, 410, 455/403, 558, 432, 435, 412, 550, 556, 557, 418, 419, 414; 340/825.5; 379/58

(56) References Cited

U.S. PATENT DOCUMENTS

| | | | |
|---|---|---|---|
| 5,404,580 A | * 4/1995 | Simpson et al. ............ 455/89 |
| 5,444,764 A | * 8/1995 | Galecki ..................... 379/58 |
| 5,699,408 A | * 12/1997 | Krolopp et al. ............ 375/59 |
| 5,742,910 A | * 4/1998 | Gallant et al. ............. 455/550 |
| 5,812,953 A | * 9/1998 | Griffith et al. ............. 455/550 |
| 5,864,757 A | * 1/1999 | Parker ...................... 455/418 |
| 5,887,253 A | * 3/1999 | O'Neil et al. .............. 455/418 |
| 6,014,561 A | * 1/2000 | Molne ....................... 455/419 |
| 6,029,143 A | * 2/2000 | Mosher et al. ............. 705/28 |
| 6,081,705 A | * 6/2000 | Houde et al. .............. 455/411 |
| 6,178,322 B1 | * 1/2001 | Creech ...................... 455/412 |

OTHER PUBLICATIONS

Digital cellular telecommunications system (Phase 2+); Personalisation of GSM Mobile Equipment (ME); Mobile functionality specification (GSM 02.22 version 7.0.0 Release 1998), ETSI TS 101 624, V7.0.0, published Aug. 1, 1999 XP002155232.

* cited by examiner

*Primary Examiner*—Daniel Hunter
*Assistant Examiner*—C. Chow
(74) *Attorney, Agent, or Firm*—Gregory A. Stephens, P.C.

(57) ABSTRACT

A method of activating a mobile station used in a cellular network system provides subsidy protection for a cellular operator. The method comprises the steps of installing a subscriber identity module (SIM) in the mobile station, the SIM having an IMSI file and storing the first indicia uniquely identifying the cellular operator, the mobile station storing second indicia uniquely identifying the cellular operator; comparing the first indicia to the second indicia to determine if the SIM and the mobile station are valid for the cellular operator; and if the SIM and the mobile station are valid, then storing a mobile identity number in the IMSI file of the SIM.

13 Claims, 2 Drawing Sheets

METHOD TO PERFORM SUBSIDY PROTECTION FOR TDMA MOBILE STATIONS

FIELD OF THE INVENTION

This invention relates to activation of mobile stations in a cellular network system and, more particularly, to a method of providing subsidy protection for a cellular operator.

BACKGROUND OF THE INVENTION

Under present practices in the United States, cellular network system operators often subsidize the price of a mobile station as part of a long-term service agreement. Therefore, the operators prefer to tie operation of the mobile station to the operators' cellular network system.

Protection of the operators' subsidy has proven straightforward in the United States' cellular network systems. This was done by downloading an international mobile station identity (IMSI) at the time of activation. The IMSI is a unique number that is allocated to each mobile subscriber. The particular mobile station is then personalized with the downloaded IMSI which is used thereafter for receiving and transmitting cellular calls.

The global system for mobile communications (GSM) uses a removable subscriber identity module (SIM) card. The SIM card stores an IMSI value, which is referred to in the GSM system as an international mobile subscriber identity. The SIM cards are conventionally pre-programmed to include the IMSI. Thus, a cellular operator typically purchases a supply of SIM cards. The mobile stations themselves do not include information that identifies the subscriber. Instead, the mobile station is a shell until the SIM card is installed. This practice makes it more difficult for an operator to provide subsidy protection. This is particularly true since the SIM card could be installed in different phones for operation even if the phone were not provided by the particular operator.

There exists a desire to utilize SIM card technology in cellular network systems presently used in the United States. However, the operators also desire the ability to download the subscriber information over the air to facilitate distribution and provisioning of mobile stations in the operator's cellular network system. These two desires have heretofore been incompatible.

The present invention is directed to overcoming the problems discussed above in a novel and simple manner.

SUMMARY OF THE INVENTION

In accordance with the invention there is provided the method of activating a mobile station used in a cellular network system to provide subsidy protection for a cellular operator. The method comprises the steps of installing a subscriber identity module (SIM) in the mobile station, the SIM having an IMSI file and storing first indicia uniquely identifying the cellular operator, the mobile station storing second indicia uniquely identifying the cellular operator; comparing the first indicia to the second indicia to determine if the SIM and the mobile station are valid for the cellular operator; and if the SIM and the mobile station are valid, then storing a mobile identity number in the IMSI file of the SIM.

It is a feature of the invention that the mobile station comprises a mobile station for use in a TDMA cellular network system.

It is another feature of the invention that the first indicia comprises a mobile country code and a mobile network code included in the IMSI file. A remainder of the IMSI file is initially blank. The second indicia comprises a mobile country code and a mobile network code and the SIM and the mobile station are valid if the first indicia is identical to the second indicia.

In accordance with another aspect of the invention, the first indicia comprises an equipment serial number (ESN). The second indicia comprises a range of ESNs and the comparing step determines if the first indicia ESN is within the range of the second indicia.

It is still another feature of the invention that the storing step comprises downloading the mobile identity number via the cellular network system.

It is disclosed in accordance with a further aspect of the invention the method of activating a mobile station used in a TDM cellular network system to provide subsidy protection for a cellular operator. The method comprises the steps of installing a subscriber identity module (SIM) in the mobile station, the SIM having an IMSI file storing first indicia uniquely identifying the cellular operator; the mobile station storing second indicia uniquely identifying the cellular operator; comparing the first indicia to the second indicia to determine if the SIM and the mobile station are valid for the cellular operator; and if the SIM and the mobile station are valid, then storing a mobile identity number in the IMSI file of the SIM.

Further features and advantages of the invention will be readily apparent from the specification and from the drawings,

DETAILED DESCRIPTION OF THE INVENTION

Figure 1:
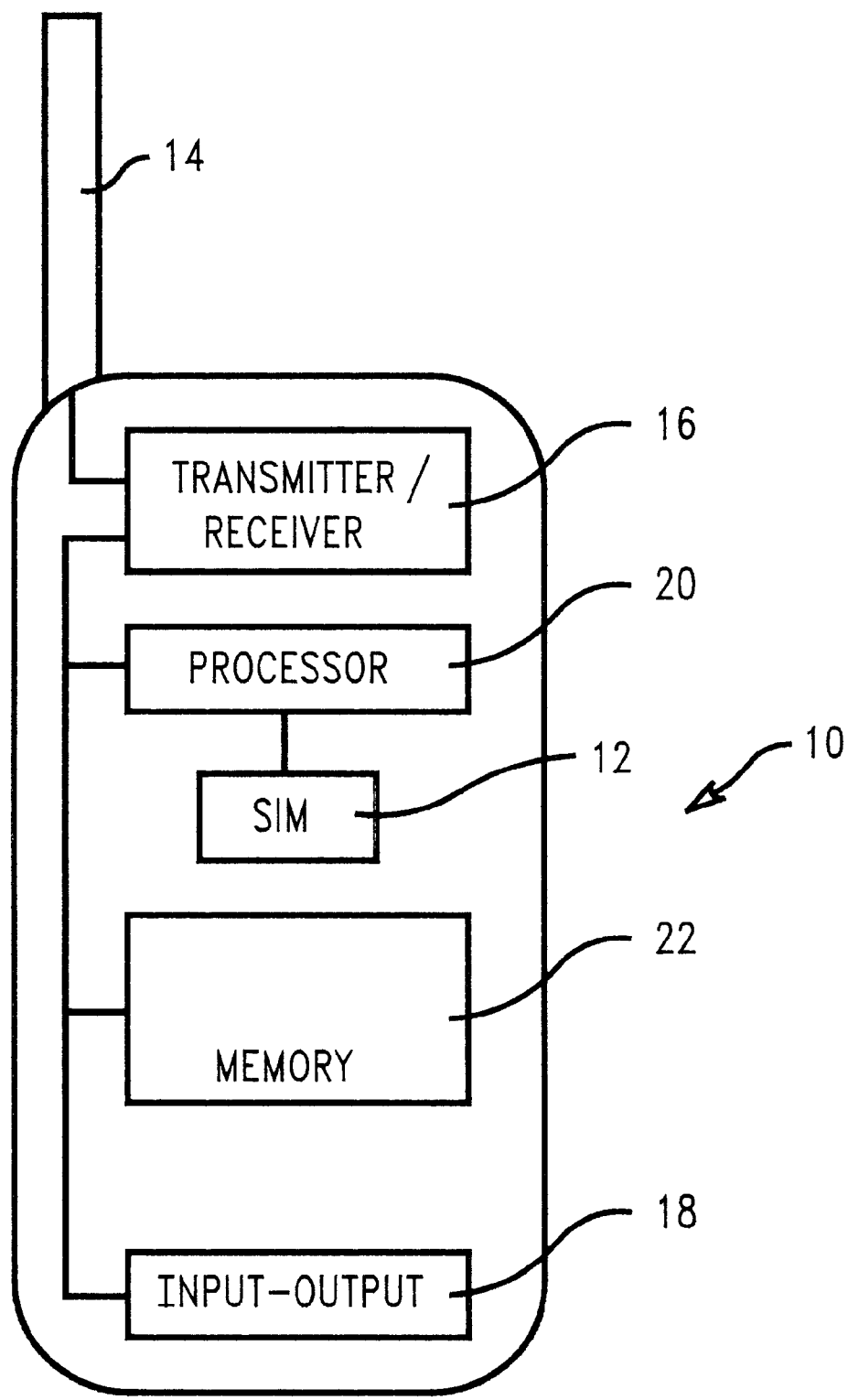
FIG. 1 is a generalized block diagram illustrating a mobile station activated in accordance with the method of the present invention.

Referring to FIG. 1, a mobile station 10 is illustrated in block diagram form. In the illustrated embodiment of the invention, the mobile station 10 comprises a GPRS-136HS mobile station. This type of mobile station 10 is used in a time division multiple access (TDMA) cellular network system. The mobile station 10 is modified to include a subscriber identity module (SIM) 12 also known as a SIM card. The SIM card 12 is generally similar to SIM cards used in global system for mobile communications (GSM) systems which contains unique subscriber information. In accordance with the invention, a method is disclosed for performing subsidy protection for a mobile station 10 including a SIM card 12.

While the method is described in connection with a mobile station using a TDMA system, the inventive method could be used in other types of cellular network systems, including the GSM system.

The mobile station 10 includes an antenna 14 for sending and receiving through-the-air radio signals between itself and a cellular network system. The antenna 14 is connected to a transmitter/receiver 16 to broadcast and receive on the same antenna 14. Particularly, the transmitter/receiver 16 includes a receiver that demodulates, de-multiplexes, and decodes the radio signals into one or more channels. Such channels include a control channel and a traffic channel for speech or data. The speech or data are delivered to an output device of an input-output circuit 18, such as a speaker. The receiver delivers messages from the control channel to a processor 20. The processor 20 controls and coordinates the functioning of the mobile station 10 responsive to messages on the control channel using programs and data stored in a memory 22 and the SIM card 12 so that the mobile station 10 can operate within the cellular-wireless network. The processor 20 also controls the operation of the mobile station 10 responsive to input from the input-output circuit 18. This input may utilize a keypad or the like as a user-input device and a display to give the user information, as is well known. The transmitter/receiver 16 also includes a transmitter that converts analog electrical signals into digital data, encodes the data with error-detection and correction information, and multiplexes this data with control messages from the processor 20. This combined data is modulated and broadcast via radio signal through the antenna 14, as is conventional.

The memory 22, in accordance with the invention, stores information relating to the capabilities of the mobile station 10 as well as information personalized to the particular cellular network system operator. In accordance with the invention, the memory 22 permanently stores a mobile country code (MCC) and mobile network code (MNC). The MCC identifies the country of the mobile subscriber. The MNC identifies the cellular operator. This data is used for performing subsidy protection in accordance with the invention.

Conventionally, a mobile station in TDMA systems will receive an international mobile station identity (IMSI) during the activation process. The IMSI is downloaded through the air via an agent of the operator. Thereafter, the IMSI is used for normal reception and transmission of calls in the cellular network system. A conventional SIM card is pre-programmed with an IMSI. In the GSM system the IMSI relates to an international mobile subscriber identity. In either case, the IMSI is composed of generally similar information. For example, in a GSM system, the IMSI includes an MCC, an MNC and a mobile subscriber identification number (MSIN) identifying the mobile subscriber within the cellular operator's system. In order to provide advantages of subsidy protection based on the GSM method which uses SIM cards, a cellular operator in accordance with the invention can download an IMSI over the air via an appropriate teleservice to facilitate distribution and provisioning of mobile stations in the cellular operator's network.

In the GSM system subsidy protection is referred to as personalization of the mobile equipment which is specified in GSM 02.22. With this subsidy protection the mobile equipment (ME) is preloaded with information defining the personalization category and input data that it is locked to. The input data is obtained by extracting the MNC and associated information, if required, from the SIM card IMSI file. This is compared against value stored in the mobile equipment. If a match is found, then the mobile station uses a normal mode of operation. If a match is not found, then the mobile station enters an emergency-calls-only mode. For subsidy protection to work in this matter, the IMSI must be preloaded onto the SIM card and thus can not be blank and then downloaded.

In accordance with the invention, a method is utilized which fulfills the requirements of both providing subsidy protection based on the GSM standards and downloading an IMSI over the air. Particularly, in accordance with the invention, the IMSI file in a SIM card is partially loaded with the MCC and the MNC. The mobile station is locked to the MCC and MNC pair by storing the same values in the mobile station memory 22. The remainder of the IMSI, being the MSIN, is blank (i. e., padded with 0×FFh or having a default value of zeroes). Because the MCC and MNC combination does not change for a cellular operator, this continues to allow the mobile equipment to be personalized using this information without the need for a fully-defined IMSI. The remainder of the IMSI can then be over-the-air downloaded without affecting the ME personalization.

An alternative method to perform subsidy protection is to look for a certain equipment serial number (ESN) for a range of ESNs from the SIM card 12 if the ESN is stored on the SIM card 12.

Figure 2:
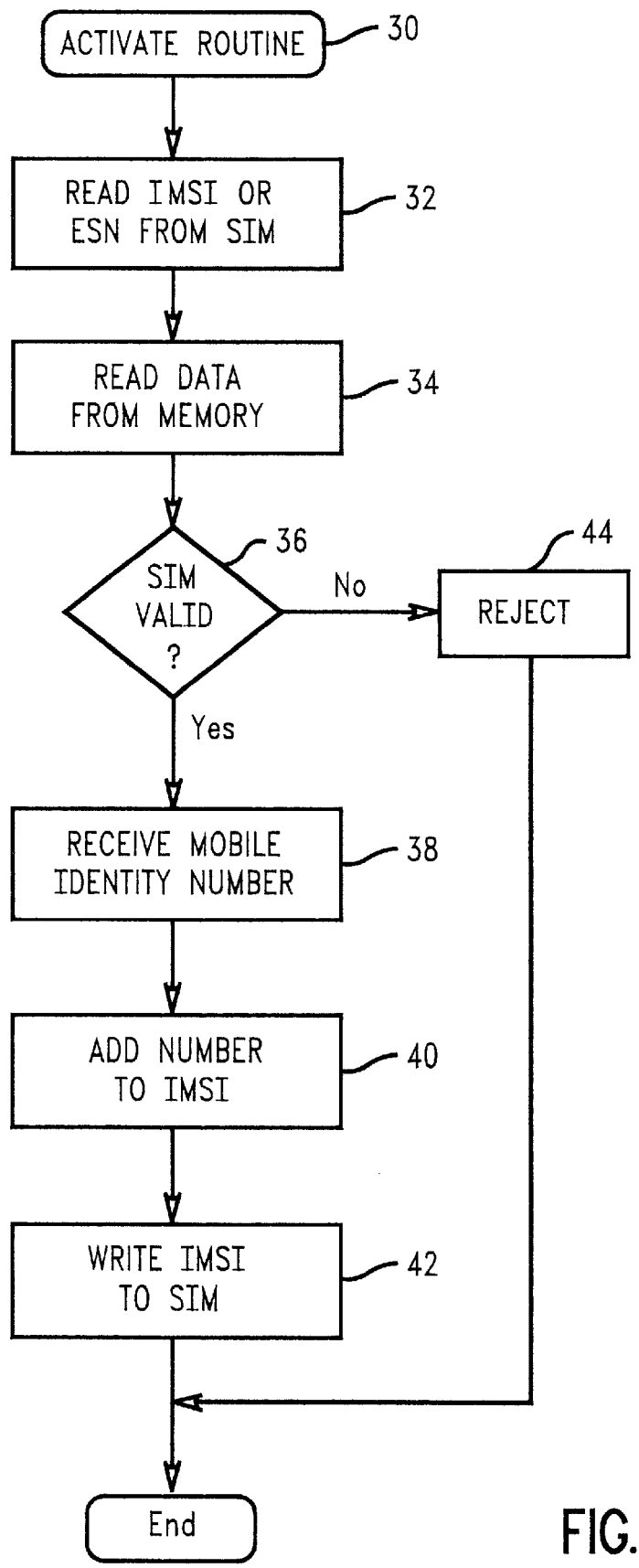
FIG. 2 is a flow diagram illustrating the method of activating the mobile station of FIG. 1 in accordance with the invention.

Referring to FIG. 2, a flow diagram illustrates a method of activating the mobile station 10 to provide subsidy protection for a cellular operator in accordance with the invention.

The activate routine is performed by an agent of the cellular operator at the time of purchasing the mobile station 10 and contracting for cellular service. A SIM card 12 having a partial IMSI or ESN, as discussed above, is installed in a mobile station 10 that is tied to the particular cellular operator. The activate routine begins at a node 30. At a block 32 indicia in the form of the IMSI or ESN is read from the SIM card 12. Data is then read from the memory 22, depending on the particular method being utilized. If authentication is based on the MCC and MNC pair, indicia identifying the MCC and MNC is read from the memory 22 at the block 34. If activation is based on the ESN, then the memory 22 stores a range of authorized ESNs. A decision block 36 determines if the SIM card 12 and mobile station 10 are valid for the particular cellular operator. Both are valid by comparing the information read from the SIM at the block 32 and the information read from the block memory 22 at the block 34. If the indicia corresponding to the MCC and MNC pair in the SIM is identical to that from the memory 22, then a mobile identity number, such as the MSIN, is received at a block 38 over the air via the appropriate teleservice being used. The mobile identity number is added to the IMSI at a block 40. The IMSI including the mobile identity number is then written to the SIM card 12 at a block 42 and the routine then ends. If the SIM card 12 is not valid for the mobile station 10, as determined at the block 36, then the operation proceeds to a reject block 44 which in effect rejects activation and the routine ends.

In addition to protecting the subsidy of mobile equipment, it may be eventually a requirement to lock a particular SIM card to a specific manufacturer. In this situation, the SIM card could have a resident application, such as a SIM tool kit application defined by GSM 11.14, to request the equipment identity of a mobile equipment and check this against a value and then only allow the ME access once successfully completed.

Thus, in accordance with the invention, there is provided a method to perform subsidy protection for a mobile station used in a TDM cellular network system by partially loading an IMSI file on a SIM card with the MCC and MNC and downloading the MSIN for the IMSI file over the air via an appropriate teleservice.

We claim:

1. The method of activating a mobile station used in a cellular network system to provide subsidy protection for a cellular operator, comprising the steps of:

installing a subscriber identity module (SIM) in the mobile station, the SIM initially having an IMSI file storing first indicia uniquely identifying the cellular operator, with a mobile identity number (MIN) field oft he IMSI initially being blank, the mobile station storing second indicia uniquely identifying the cellular operator;

comparing the first indicia to the second indicia to determine if the SIM and the mobile station are valid for the cellular operator; and if the SIM and the mobile station are valid, then storing a mobile identity number in the IMSI file MIN field of the SIM.

2. The method of claim 1 wherein the mobile station comprises a mobile station for use in a TDMA cellular network system.

3. The method of claim 1 wherein the first indicia comprises a mobile country code and a mobile network code included in the IMSI file.

4. The method of claim 3 wherein a remainder of the IMSI file is initially blank.

5. The method of claim 3 wherein the second indicia comprises a mobile country code and a mobile network and the SIM and mobile station are valid if the first indicia is identical to the second indicia.

6. The method of claim 1 wherein the first indicia comprises an equipment serial number (ESN).

7. The method of claim 6 wherein the second indicia comprises a range of ESNs and the comparing step determines if the first indicia ESN is within the range of the second indicia.

8. The method of claim 1 wherein the storing step comprises downloading the mobile identity number via the cellular network system.

9. The method of activating a mobile station used in a TDMA cellular network system to provide subsidy protection for a cellular operator, comprising the steps of:

installing a subscriber identity module (SIM) in the mobile station, the SIM initially having an IMSI file storing first indicia uniquely identifying the cellular operator, with a mobile identity number (MIN) field of the IMSI initially being blank, the mobile station storing second indicia uniquely identifying the cellular operator;

comparing the first indicia to the second indicia to determine if the SIM and the mobile station are valid for the cellular operator; and if the SIM and the mobile station are valid, then storing a mobile identity number in the IMSI file MIN field of the SIM.

10. The method of claim 9 wherein the first indicia comprises a mobile country code and a mobile network code included in the IMSI file.

11. The method of claim 10 wherein a remainder of the IMSI file is initially blank.

12. The method of claim 10 wherein the second indicia comprises a mobile country code and a mobile network and the SIM and mobile station are valid if the first indicia is identical to the second indicia.

13. The method of claim 9 wherein the storing step comprises downloading the mobile identity number via the cellular network system.

* * * * *